3,009,902
SUBSTITUTED HYDANTOIC ACID RESINS AND THEIR PREPARATION

Emil Kaiser, Chicago, Ill., assignor, by mesne assignments, to Armour and Company, Chicago, Ill., a corporation of Delaware
No Drawing. Filed Oct. 4, 1956, Ser. No. 613,832
8 Claims. (Cl. 260—67.5)

This invention relates to new synthetic resins and to a process for their preparation. It is more particularly related to resins prepared from substituted hydantoic acids, urea, and formaldehyde.

It is a general object of this invention to provide new and useful resins. A further object of the invention is to provide a process for the preparation of such resins. A more specific object is to prepare new and useful resins from substituted hydantoic acids which are derived from protein hydrolysates and amino acids. Another specific object is to prepare resins by the reaction of α-substituted hydantoic acids, urea and formaldehyde.

Substituted hydantoic acids are produced from readily obtainable raw materials. Amino acids, which may be isolated pure acids or mixtures of amino acids such as are produced by the hydrolysis of a protein, are converted to mixtures of substituted hydantoic acids by known procedures. Such procedures include boiling the amino acid or mixture of amino acids with urea in an alkaline solution according to the following general formula $$H_2NCONH_2 + H_2NCHRCOONa \xrightarrow{NaOH} H_2NCONHCHRCOONa + NH_3$$

An alternative procedure for converting amino acids into substituted hydantoic acids by the action of potassium cyanate is illustrated by the following formula $$KOCN + H_2NCHRCOOH \rightarrow H_2NCONHCHRCOOK$$

In the above formulas R is either hydrogen or a monovalent radical derived from an amino acid. After the completion of one of these reactions, the reaction mixture is acidified and the precipitated acids removed by filtration.

In carrying out these reactions glycine present in the reaction mixture reacts with urea to form hydantoic acid. Other amino acids, with the exception of proline and hydroxyproline, are converted into substituted hydantoic acids according to the formulas given above. In these reactions proline is converted to a substituted hydantoic acid of the following formula

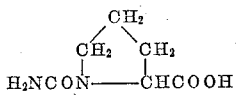

Similarly, hydroxyproline yields a substituted hydantoic acid of the following formula

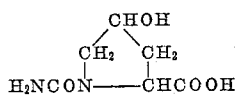

In the process of this invention a substituted hydantic acid is mixed with an aqueous formaldehyde solution. This mixture is first heated slightly, then cooled to about 45° C. at which temperature urea is added with rapid stirring. The mixture reacts rapidly upon solution of the urea. This product is removed from the reaction mixture and air-dried. It is a high melting resin having many desirable properties.

The product and process of the invention is illustrated by the following examples. The reaction temperatures used in the processes and in the examples below are not critical, and higher or lower temperatures than those specified may be used if desired.

EXAMPLE I

*Preparation of a resin from a substituted hydantoic acid mixture*

A mixture of substituted hydantoic acids was prepared according to ordinary procedures from a commercially available crude protein hydrolysate, the residue of a glutamic acid extraction process. The mixed acids (200.0 g.) were heated with stirring with 250 ml. of 37% formaldehyde. When the temperature of the mixture reached 80° C. the heating was discontinued and the mixture cooled to 45° C. At this temperature, 50 g. of urea was added with rapid stirring. The temperature of the mixture dropped slightly due to the dissolution of the urea, then rapidly rose to about 63° C. The reaction mixture became thick in a few seconds and could not be stirred further. The product was washed several times with water, lifted out of the beaker and air dried. A hard lump of resin weighing 470 g. was obtained. Since the interior position of this material was still wet it was ground in a plate grinder and completely air-dried. The final resinous product melted above 300° C.

EXAMPLE II

*Preparation of a resin from mixtures of substituted hydantoic acids in the presence of toluene*

To 375 ml. of a 37% aqueous solution of formaldehyde was added 300 g. of a mixture of hydantoic acid and substituted hydantoic acids obtained from protein hydrolysis. Then mixture was stirred with an air stirrer and heated on a hot plate in a 3 liter stainless steel beaker. When the mixture of hydantoic acids dissolved in the formaldehyde solution (at about 80° C.) 750 ml. of toluene was added with stirring, the mixture cooled to about 45° C. and 75 g. of urea was added. The temperature dropped slightly upon the dissolution of the urea then rose to 55° C. Lumps of resin appeared but did not stick to the stirrer as in the preparations without toluene. A soft rubberlike material separated out in about a minute. Approximately 150 ml. of toluene was drawn off the reaction mixture and 1.5 l. of water was added. The remaining toluene and water were removed by vacuum distillation and the beaker containing the lumpy resinous residue was heated in a boiling water bath. After the water and toluene were removed, the lumps of resin in the beaker were no longer sticky and could be lifted out. These lumpy masses of resin were air-dried, then broken up and ground on a plate mill. The powdered resin was again air-dried in a wind oven at 135° F. When heated on a melting point block no change occured up to 300° C. In a capillary tube a sample of the resin foamed at 205° C.

The following analytical values for the air-dried powder were obtained:

|  | Percent |
|---|---|
| Moisture | 4.76 |
| Nitrogen | 17.05 |
| Alkali soluble | 41.3 |
| COOH groups— | |
| 1.98 millequivalents/g. (water titration) | |
| 0.93 millequivalent/g. (alcohol titration) | |

The resins produced by the methods of both Examples I and II are very durable and strong. They are heat resistant and possess many other valuable characteristics giving them wide application for industrial uses.

While in the foregoing description and examples we have set forth certain products and methods of their

I claim:

1. The product obtained by effecting reaction between urea and the reaction product of formaldehyde and at least one compound having the formula

H₂NCONHCHRCOOH wherein R is selected from the group consisting of hydrogen and a radical such that

is an alpha amino acid.

2. The product obtained by effecting reaction between urea and the reaction product of formaldehyde and a compound having the formula

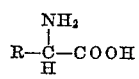

3. A process for preparing a resin which comprises effecting reaction between urea and the reaction product of formaldehyde and at least one compound having the formula H₂NCONHCHRCOOH wherein R is selected from the group consisting of hydrogen and a radical such that

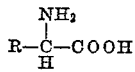

is an alpha amino acid.

4. A process for preparing a resin which comprises heating in an aqueous solution of formaldehyde at least one compound having the formula

H₂NCONHCHRCOOH wherein R is selected from the group consisting of hydrogen and a radical such that

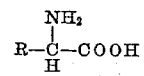

is an alpha amino acid, bringing the temperature of the reaction product thus formed to about 45° C., adding urea with agitation to the reaction product, and separating the resin formed thereby from the reaction zone.

5. A composition of matter comprising a substituted hydantoic acid-formaldehyde-urea resin in which the substituted hydantoic acid portion is represented by the formula

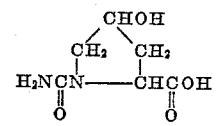

6. A new composition of matter comprising a resin which is the reaction product of formaldehyde, urea and an alpha amino carboxylic acid having a carbamyl group substituted for one hydrogen atom of the amino group attached to the alpha carbon atom of said amino acid.

7. The composition of claim 6 wherein said amino acid is naturally occurring amino acid which is obtained from the acid hydrolysis of a protein.

8. The composition of claim 6 wherein said amino acid having a carbamly group substituted for one hydrogen atom of the amino group attached to the alpha carbon atom of said amino acid is the major component of said resin.

References Cited in the file of this patent

UNITED STATES PATENTS

| | | |
|---|---|---|
| 2,341,266 | D'Alelio | Feb. 28, 1944 |
| 2,377,866 | D'Alelio | June 12, 1945 |
| 2,389,416 | D'Alelio | Nov. 20, 1945 |
| 2,680,682 | Dearing | June 8, 1954 |

OTHER REFERENCES

The Van Nostrand Chemists Dictionary, p. 560–561, D. Van Nostrand Co. (1953).